(12) United States Patent
Guerci et al.

(10) Patent No.: US 10,751,569 B2
(45) Date of Patent: Aug. 25, 2020

(54) SYSTEM AND METHOD FOR 3D OPTICAL TRACKING OF MULTIPLE IN-FLIGHT GOLF BALLS

(71) Applicant: INFORMATION SYSTEMS LABORATORIES, INC., San Diego, CA (US)

(72) Inventors: Joseph R. Guerci, La Jolla, CA (US); David R. Kirk, Springfield, VA (US); Jameson S. Bergin, Glastonbury, CT (US); Raymond M. Guerci, San Diego, CA (US); Joel R. Studer, San Diego, CA (US); Brian C. Watson, Gainesville, FL (US); Jeffrey R. Ridgway, San Diego, CA (US)

(73) Assignee: INFORMATION SYSTEMS LABORATORIES, INC., San Diego, CA (US)

(*) Notice: Subject to any disclaimer, the term of this patent is extended or adjusted under 35 U.S.C. 154(b) by 636 days.

(21) Appl. No.: 15/634,989

(22) Filed: Jun. 27, 2017

(65) Prior Publication Data

US 2018/0369638 A1 Dec. 27, 2018
US 2020/0139193 A9 May 7, 2020

(51) Int. Cl.
| | |
|---|---|
| *A63B 69/36* | (2006.01) |
| *A63B 24/00* | (2006.01) |
| *A63B 71/06* | (2006.01) |
| *G01S 5/00* | (2006.01) |
| *G01B 5/00* | (2006.01) |
| *G01B 11/00* | (2006.01) |

(Continued)

(52) U.S. Cl.
CPC ...... *A63B 24/0021* (2013.01); *A63B 69/3694* (2013.01); *A63B 71/0622* (2013.01); *G01B 5/0023* (2013.01); *G01B 11/002* (2013.01); *G01S 5/0054* (2013.01); *G06T 7/20* (2013.01); *A63B 2024/0034* (2013.01); *A63B 2071/0638* (2013.01); *A63B 2102/32* (2015.10); *A63B 2220/806* (2013.01); *G06T 2207/30224* (2013.01); *G06T 2207/30241* (2013.01)

(58) Field of Classification Search
USPC .......................... 473/152, 156, 198, 199, 409
See application file for complete search history.

(56) References Cited

U.S. PATENT DOCUMENTS

| | | | | |
|---|---|---|---|---|
| 5,413,345 | A | * 5/1995 | Nauck ................ | A63B 24/0003 348/157 |
| 5,938,545 | A | * 8/1999 | Cooper .............. | A63B 69/3658 473/407 |

(Continued)

*Primary Examiner* — Nini F Legesse
(74) *Attorney, Agent, or Firm* — Nydegger & Associates

(57) ABSTRACT

A system for visually tracking the trajectory of an in-flight golf ball through an x-y-z space above a driving range includes a plurality of cameras for respectively creating a video stream of the x-y-z space. Each video stream is presented on a dedicated camera focal plane with information on respective azimuth angles θ and elevation angles φ from the particular camera to the in-flight golf ball. A central computer is connected with the camera focal plane of each camera to identify a start point for the golf ball, to track its trajectory in the x-y-z space, and to filter out background clutter. A visual display is provided to show the in-flight golf ball from its start point to a target point in real time.

18 Claims, 3 Drawing Sheets

(51) Int. Cl.
    *G06T 7/20*     (2017.01)
    *A63B 102/32*     (2015.01)

(56) References Cited

U.S. PATENT DOCUMENTS

| | | | |
|---|---|---|---|
| 6,320,173 B1* | 11/2001 | Vock | A63B 24/0003 |
| | | | 250/206.1 |
| 8,085,188 B2 | 12/2011 | Tuxen | |
| 8,335,345 B2* | 12/2012 | White | A63B 24/0003 |
| | | | 382/103 |
| 8,845,442 B2 | 9/2014 | Tuxen | |
| 8,912,945 B2 | 12/2014 | Tuxen | |
| 2004/0032970 A1* | 2/2004 | Kiraly | A63B 24/0021 |
| | | | 382/103 |
| 2011/0286632 A1 | 11/2011 | Tuxen | |
| 2013/0039538 A1* | 2/2013 | Johnson | G06T 7/20 |
| | | | 382/103 |
| 2014/0347212 A1 | 11/2014 | Tuxen | |

* cited by examiner

SYSTEM AND METHOD FOR 3D OPTICAL TRACKING OF MULTIPLE IN-FLIGHT GOLF BALLS

FIELD OF THE INVENTION

The present invention pertains generally to systems and methods that incorporate an entertainment feature into golf swing practice sessions at a driving range, which can simultaneously accommodate a large number of golfers. In particular, the present invention pertains to systems and methods that allow a golfer to receive a visual presentation for the trajectory of his/her in-flight golf ball from a tee-line onto the turf of a driving range, for use in perfecting the accuracy of his/her golf swing. The present invention is particularly, but not exclusively, useful as a system or method for isolating an in-flight golf ball trajectory for a particular golfer from a large number of contemporaneous in-flight golf balls having a density commensurate with a busy state-of-the-art golf range.

BACKGROUND OF THE INVENTION

In overview, it is well known there are various technologies which have been developed that provide a capability for tracking the in-flight trajectory of an airborne object. These include highly sophisticated technologies for military applications and for commercial air traffic control, as well as less sophisticated technologies, such as tracking a single in-flight golf ball at televised professional golf tournaments. In each case, the technology is adapted to be venue-specific. This is also the case for the present invention.

Unlike venues for other technologies such as those referred to above, the venue for the present invention is unique unto itself. In particular, the present invention pertains to golf ball driving ranges that can now include multi-deck versions. Accordingly, air space restrictions, golf ball density and flight duration in the airspace envisioned for the present invention are specific differentiators from other technologies.

As envisioned for the present invention, the air space of interest is relatively small and confined. Typically, commercial driving ranges have a width of around 100 yards and a down range distance that is normally less than 300 yards. Moreover, the present invention will inevitably encounter a plethora of in-flight golf balls at any one time (e.g. more than 30 golf balls simultaneously in flight). Furthermore, the duration of flight for each golf ball will be typically less than 20 seconds.

With the above in mind, it is an object of the present invention to visually track the in-flight trajectory of a single golf ball in an extremely crowded air space. Another object of the present invention is to visually present the in-flight trajectory of a golf ball from the start point where it is launched to an end point at a real or projected target on a driving range, wherein static background clutter and other in-flight golf balls are eliminated from the visual presentation. Yet another object of the present invention is to provide a system and method for visually tracking an in-flight golf ball that is relatively simple to manufacture, is easy to use, and is comparatively cost effective.

SUMMARY OF THE INVENTION

In accordance with the present invention, a system for visually tracking the in-flight trajectory of a golf ball includes: a driving range which defines a three dimensional (3D) x-y-z airspace; an n number of cameras positioned on a periphery of the airspace for creating contiguous video streams with respective fields of view from different sectors of the airspace; a central computer for processing images from the different video streams; and an m number of display monitors, with each display monitor positioned on a tee-line, in a respective bay where a golf ball is launched. Using this combination of components, the present invention visually tracks the in-flight trajectory of the golf ball that is launched from the particular bay. Additionally, the system of the present invention can include a laser light projector for presenting projected targets onto the driving range.

With regard to the driving range, it will generally have a typical layout with a plurality of bays positioned in alignment along the tee-line. An open space (i.e. the range) extends away from the tee-line. Further, it may include multi-levels of bays in tiers along the tee-line. In any event, the open space of the driving range will define a periphery.

As implied above, the system of the present invention includes an n number of high-resolution, high speed, full motion, digital cameras. Each camera is surveyed into a position on the periphery of the driving range, and the cameras are preferably paired with another camera. Within a pair, each camera is positioned opposite the other relative to a center line of the driving range. Specifically, this is done to establish overlapping fields of view for cameras in the pair. In this manner, a pair of cameras effectively cover a sector of the driving range. In further detail, a first pair of cameras are positioned with their respective fields of view covering all bays along the tee-line, together with approximately the first 100 yards of the driving range from the tee-line. Also, all of the bays along the tee-line are individually mapped into cameras of the first pair covering the bays. Additional pairs of cameras are similarly surveyed and positioned down range from the first pair to establish contiguous sectors over the entire driving range.

The central computer is connected directly to each camera (i.e. all n cameras) to receive a video stream of the particular camera's field of view. In detail, the computer creates a camera-specific focal plane which is created from its video stream. Pixels from the video stream (video signal) are then arranged in the camera focal plane with a horizontal axis and an orthogonal vertical axis. In this arrangement, the position of a pixel on the horizontal axis of the focal place corresponds with an azimuth angle $\theta_n$ of the golf ball relative to the carriers. Similarly, the position of the pixel on the vertical axis of the focal plane corresponds to the elevation angle $\phi_n$ of the golf ball relative to the camera. The computer then uses value for $\theta_n$ and $\phi_n$ for calculating the track of the golf ball's in-flight trajectory.

For the present invention, the 3D track for a golf ball's in-flight trajectory can be calculated in either of two ways, both of which involve $\theta_n$ and $\phi_n$. In one way, a range R is established from cameras on the tee-line to a golf ball location in a selected bay, and the range R is established at the time the golf ball is launched. Specifically, this is done by reference to a calibration of pixels in the x-y plane between the camera and the golf ball in the bay. The result here is an accurate association of the camera with the bay for subsequent 3-D tracking of the in-flight trajectory of the golf ball. In another way, $\theta_n$ and $\phi_n$ are mathematically manipulated together with distances along a base line of length L between the cameras of the first sector. In any event, the computer continuously calculates x, y and z coordinates for the golf ball during flight and relays this information to the visual monitor in the bay from which the golf ball was launched. This information is then presented on the monitor to allow the golfer to evaluate his/her performance.

It is an important feature of the present invention that static background clutter and objects moving slower than a predetermined speed which is below that of an in.-flight golf ball are filtered from the camera's field of view. Also, the in-flight trajectories of golf balls that are launched from bays other than the one from which the particular golf ball being followed was launched are filtered out. Consequently, the visual monitor in each bay receives a visual signal that includes only the flight trajectory of the golf ball that was launched from that particular bay.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
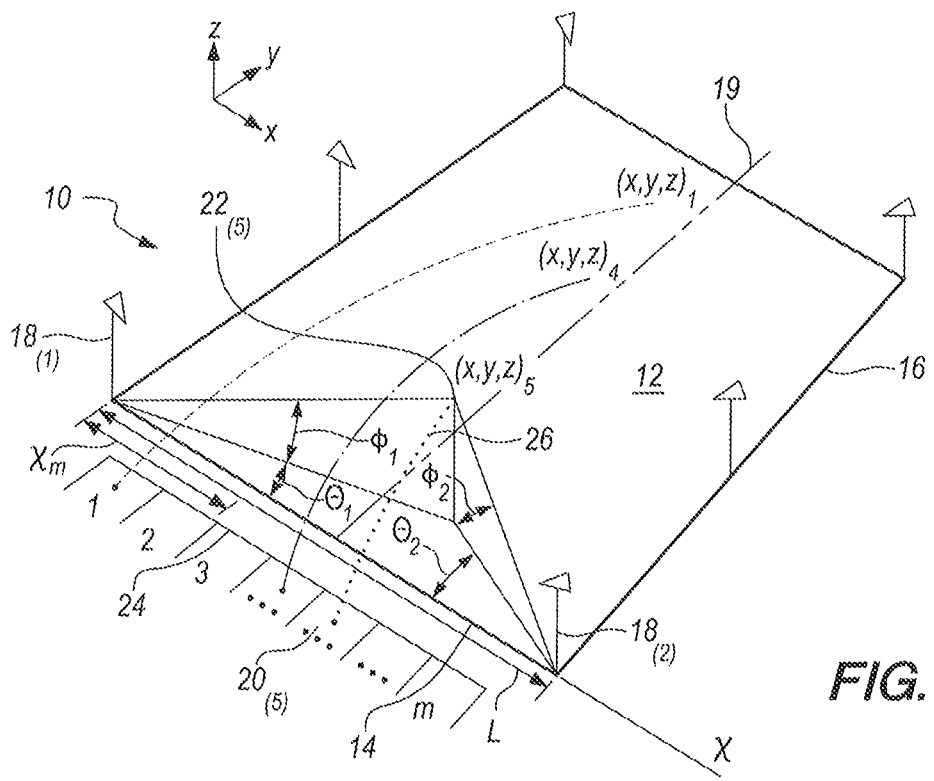
FIG. 1 is a perspective view of an active driving range in accordance with the present invention at a time is.

Referring initially to FIG. 1, a venue in accordance with the present invention is shown and is generally designated 10. As shown, the venue 10 includes a golf driving range 12 that is bounded by a base line 14 and a periphery 16, and which defines an x-y-z space above the turf of the driving range 12. An n number of cameras 18 are surveyed onto the driving range 12 with respective x-y-z coordinates, and are positioned at predetermined locations on the periphery 16. Further, as indicated in FIG. 1, the first camera $18_{(1)}$ and the second camera $18_{(2)}$ are used to define the base line 14 between them, and they also establish a length L therebetween for the base line 14. As also shown in FIG. 1, a center line 19, together with the base line 14, effectively define an x-y plane for the venue 10, and the number of cameras 18 will typically be six.

It is also indicated in FIG. 1 that each of the cameras 18 can identify an azimuth angle $\theta_n$ and an elevation angle $\phi_n$ which are uniquely defined by the $n^{th}$ camera. For example, camera $18_{(1)}$ defines an azimuth angle $\theta_1$ and an elevation angle $\phi_1$ while camera $18_{(2)}$ defines an azimuth angle $\theta_2$ and an elevation angle $\phi_2$.

Figure 2:
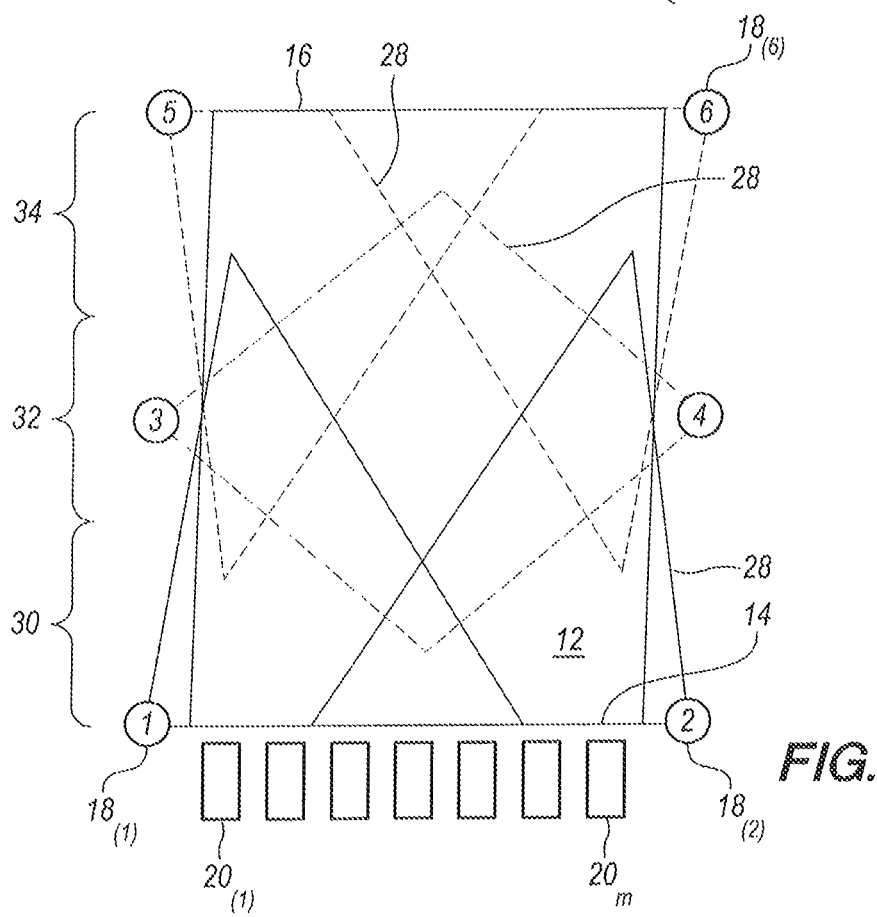
FIG. 2 is a top plan view of the driving range showing camera fields of view and golf ball tracking sectors for the driving range.

FIG. 1 also shows that an m number of bays 20 are provided in the venue 10 for launching golf balls 22 into the driving range 12. As shown, the m number of bays 20 are typically aligned along a tee-line 24 that will most often be established generally parallel with the base line 14. In this arrangement, consider a golf ball $22_{(5)}$ which is launched from the fifth bay $20_{(5)}$ on the tee-line 24 and onto an in-flight trajectory 26 into the x-y-z space above the turf of the driving range 12. At a selected time $t_s$ after launch, while the golf ball $22_{(5)}$ is still in the air, it will be at coordinates $(x-y-z)_{(5)}$. Importantly, at any time $t_s$ during the flight of the golf ball $22_{(5)}$ the first camera $18_{(1)}$ will record an azimuth angle $\theta_1$ and an elevation angle $\phi_1$. Simultaneously, the second camera $18_{(2)}$ will record an azimuth angle $\theta_2$ and an elevation angle $\phi_2$. As disclosed below in detail, this concurrent recording continues until the golf ball $22_{(5)}$ is either passed to another pair of cameras 18, or the golf ball $22_{(5)}$ is no longer in flight. Consequently, in accordance with disclosure presented below, $\theta_1$, $\phi_1$, $\theta_2$ and $\phi_2$ are used to record and calculate the trajectory 26 from the time of launch until flight is terminated, In FIG. 2 six cameras 18 are shown with their respective fields of view 28 superposed on each other. In detail, the fields of view 28 for the first camera $18_{(1)}$ and the second camera $18_{(2)}$ are shown as a cooperating pair, with their fields of view 28 outlined by solid lines. Similarly, the fields of view 28 for the third camera $18_{(3)}$ and the fourth camera $18_{(4)}$ are shown as a cooperating pair with their fields of view 28 outlined by dashed lines, and the fields of view 28 for the fifth camera $18_{(5)}$ and the sixth camera $18_{(6)}$ are shown as a cooperating pair with their fields of view 28 outlined by clash-dot lines. Thus, the fields of view 28 are all contiguous and they overlap to give redundancy in their cooperative coverage of the driving range 12. It is an important feature of the positioning of cameras 18 that their respective fields of view 28 effectively divide the driving range 12 into three sectors, 30, 32 and 34, with each sector 30, 32 and 34 covered by a pair of cameras 18.

Figure 3A:
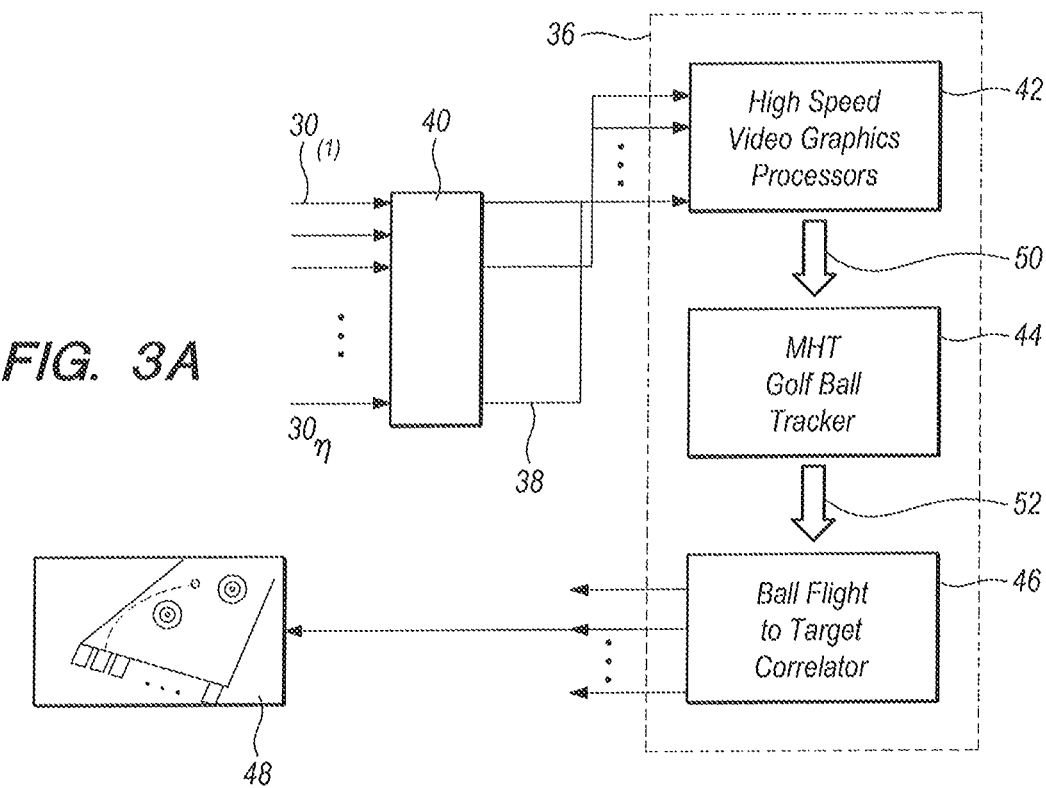
FIG. 3A is a schematic layout of components for a preferred embodiment of the central computer of the present invention.

FIG. 3A shows an arrangement of components for a preferred embodiment of the present invention which includes a central computer 36. As shown, the central computer 36 is used to receive the camera output 38 of each camera 18 from a network router 40. In this combination, each camera output 38 is fed directly to the central computer 36 and, more specifically, to a golf ball acquisition unit 42 in the central computer 36.

For a preferred embodiment of the present invention, the central computer 36 will include the golf ball acquisition unit 42, noted above, a golf ball tracking unit 44, and a golf-ball/target correlator 46. The golf-ball/target correlator 46 of the central computer 36 is connected directly with a respective display monitor 48 that is located respectively in each bay 20 on the tee-line 24.

In detail, the golf ball acquisition unit 42 of the central computer 36 is used to detect all moving golf balls 22 within the respective fields of view 28 of each camera 18. The golf ball acquisition unit 42 then uses this information to compute the location of each golf ball 22, and uniquely identify each golf ball 22 within the reference system $(\theta_n, \phi_n)$ of each camera 18. The golf ball acquisition unit 42 also isolates identified golf balls 22 from others, by filtering out background clutter and moving objects other than the particular identified golf ball 22. Thus, the output 50 that is passed from the golf ball acquisition unit 42 to the golf ball tracking unit 44 includes multiple tracks (i.e. trajectories 26) that include a particular trajectory 26 for each identified golf ball 22.

Figure 3B:
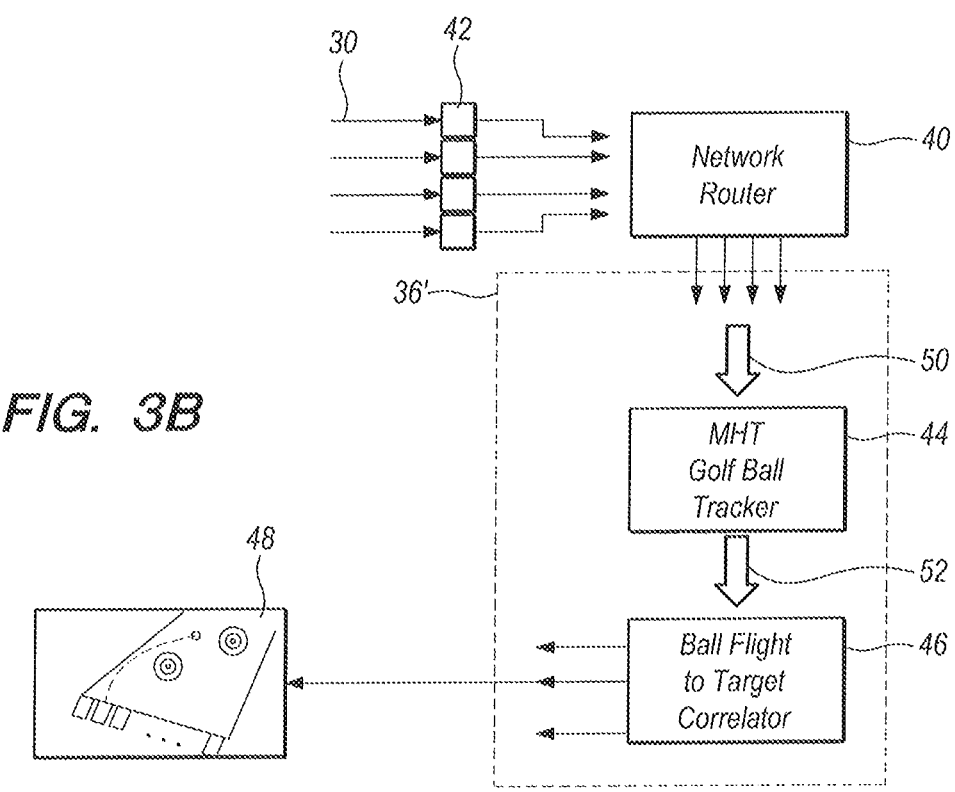
FIG. 3B is a schematic layout of components for an alternate embodiment of the central computer of the present invention.

For an alternate embodiment of the present invention, as shown in FIG. 3B, the functionality of the golf ball acquisition unit 42 can be accomplished before the output 50 in the video stream is passed to a modified control computer 36'. For the alternate embodiment, the signal processing that is accomplished by the golf ball acquisition unit 42 prior to the transfer of output 50 to the network router 40 may be more cost effective. In any event, for either a preferred embodiment (FIG. 3A) or an alternate embodiment (FIG. 3B), each identified golf ball 22 can be followed separately on its in-flight trajectory 26 from the time it is launched out of a bay 20 until its flight is terminated. Essentially this is done by creating a database for each golf ball 22 that starts with its location in a bay 20 at launch. The location of golf ball 22 is thereafter continuously updated, as detected by the cameras 18, with reference to the record of the existing track it is creating in the database. The result here is a plurality of respectively resolved trajectories 26 for each in-flight golf ball 22. Collectively, this information is passed as an output 52 from the golf ball tracking unit 44 to the golf-ball/target correlator 46.

By following the trajectory 26 of a golf ball 22 in the output 52 from the golf ball tracking unit 44, the golf-ball/target correlator 46 is able to correlate the actual location where a particular trajectory 26 terminates, with an intended target location (not shown). Stated differently, the golf-ball/target correlator 46 determines the distance by which the golf ball 22 misses its intended target. Further, a video presentation of the trajectory 26 and its relation to a target (not shown) can be provided on a display monitor 48 for viewing by a golfer in the bay 20 from which the golf ball 22 is launched.

An important feature for the venue 10 of the present invention is the ability to follow the in-flight trajectory 26 of a golf ball 22 from its launch point in a bay 20 to an end point where the trajectory 26 is terminated. Structurally, the components involved in this operation are the golf ball acquisition unit 42 and the golf ball tracking unit 44 of the central computer 36. As noted earlier, each bay 20 in the tee-line 24 can be calibrated (mapped) into the video stream of selected cameras 18. Most importantly, the calibration (i.e. mapping) is done for the first camera $18_{(1)}$ and the second camera $18_{(2)}$. From this, it is to be appreciated that an operation of the present invention is thereafter accomplished within the reference system ($\theta_n$, $\phi_n$) of each camera 18.

Figure 4A:
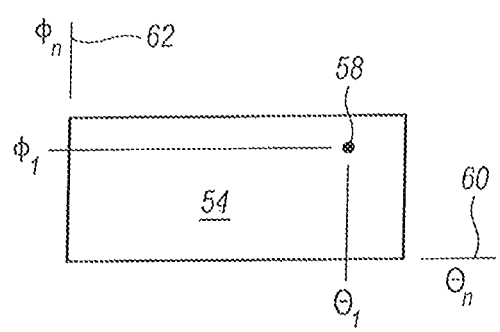
FIG. 4A is a presentation of the camera focal plane in the video stream generated by the (n) camera, showing the azimuth angle $\theta_n$ and the elevation angle $\phi_n$ of a selected in-flight golf ball at a time $t_s$.
Figure 4B:
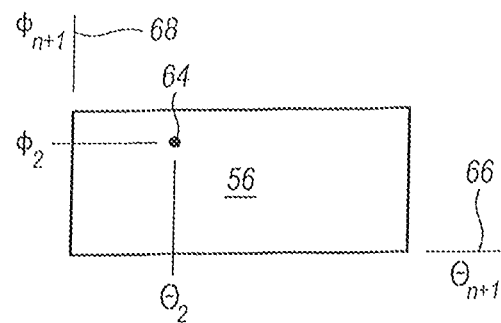
FIG. 4B is a presentation of the camera focal plane in the video stream generated by the n+1 camera, showing the azimuth angle $\theta_{n+1}$ and the elevation angle $\phi_{n+1}$ of the selected in-flight golf ball at the time $t_s$.

With the above in mind, arid with reference to FIGS. 4A and 4B, it is to be appreciated that measurements for following each individual golf ball 22 on its respective trajectory 26 in the driving range 12 will preferably employ the use of two cameras 18. For this purpose, as noted above, the cameras 18 are organized into cooperative pairs. For example, a first camera $18_{(1)}$ and a second camera $18_{(2)}$ establish a cooperating pair of cameras 18 which have their respective fields of view 28 directed onto the sector 30 of the driving range 12 (see FIG. 2). Similarly, a third camera $18_{(3)}$ and a fourth camera $18_{(4)}$ will cover the sector 32, and a fifth camera $18_{(5)}$ and a sixth camera $18_{(6)}$ will cover the sector 34.

With specific consideration of the first camera $18_{(1)}$ and the second camera $18_{(2)}$ as a cooperating pair of cameras 18 covering the sector 30, each camera 18 will respectively record different azimuth angles $\theta$ as well as different elevation angles $\phi$. Thus, as intended for the present invention, the first camera $18_{(1)}$ will record $\theta_1$ and $\phi_1$ while the second camera $18_{(2)}$ records $\theta_2$ and $\phi_2$. This data will then be sent by the respective cameras $18_{(1)}$ and $18_{(2)}$ on their respective video streams (video signals) to the central computer 36 for manipulation by the golf ball tracking unit 44.

By way of example, and with reference back to FIG. 1, consider the cameras $18_{(1)}$ and $18_{(2)}$ (i.e. n=1) as they track the golf ball $22_{(5)}$ after it is launched from the fifth bay $20_{(5)}$ into the driving range 12. While the golf ball $22_{(5)}$ is in flight, the tracking unit 44 effectively creates focal plane 54 (FIG. 4A) from the video stream of the first camera $18_{(1)}$. Specifically, as shown in FIG. 4A, the golf ball $22_{(5)}$ will appear as a pixel 58 in the focal plane 54. By constructing the focal plane 54 so that its horizontal axis 60 corresponds to azimuth angles $\theta$ and its vertical axis 62 corresponds to elevation angles the angles $\theta_1$ and $\phi_1$ can be determined relative to the first camera $18_{(1)}$ at any time $t_s$. Similarly, as shown in FIG. 4B, the golf ball $22_{(5)}$ will appear at the same time $t_s$ as a pixel 64 in the focal plane 56. By constructing the focal plane 56 so that its horizontal axis 66 corresponds to azimuth angles $\theta$ and its vertical axis 68 corresponds to elevation angles $\phi$, the angles $\theta_2$ and $\phi_2$ can be determined relative to the second camera $18_{(2)}$. The values for $\theta_1$, $\phi_1$, $\theta_2$ and $\phi_2$, can then be used to effectively track the trajectory 26 for the golf ball $22_{(5)}$. This can be done in either of two ways.

One way for tracking a golf ball 22 in accordance with the present invention is to establish a range R from a camera 18 (e.g. cameras $18_{(1)}$ and/or $18_{(2)}$) to a golf ball 22 at its location in a selected bay 20. In this case, the range R is established at, or prior to, the time the golf ball 22 is launched. As disclosed above, this is done by calibrating (referencing) pixels 64 from the golf ball 22 from a selected bay 20 with the video streams of the cameras 18 (e.g. cameras $18_{(1)}$ and/or $18_{(2)}$). The result here is an accurate association of the cameras 18 with the bay 20 for subsequent 3-D tracking of the in-flight trajectory 26 of the golf ball 22.

Figure 5A:
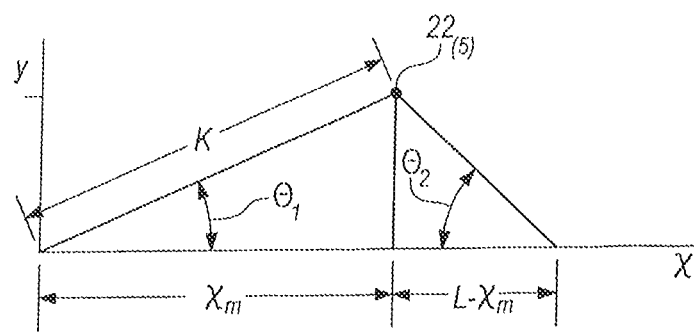
FIG. 5A is a geometrical presentation of azimuth angles $\theta_1$, and $\theta_2$ in the x-y plane of a selected in-flight golf ball for use in calculating values for the x and y coordinates of the golf ball at the time $t_s$.

In an alternate embodiment, a mathematical manipulation for the coordinates of a golf ball 22 in x-y-z space at any point in time $t_s$ on its flight trajectory 26, is based on known geometrical values of the system. In detail, these geometrical values are: 1) values for an azimuth angle $\theta_n$ and an elevation angle $\phi_n$ which are measured respectively from each of the n numbered cameras 18; 2) the length L of the base line 14 between the first camera $18_{(1)}$ and the second camera $18_{(2)}$; and 3) the distance $x_m$ of a bay 20 along the base line 14 from the first bay $20_{(1)}$, where there are an m number of bays. For these manipulations, azimuth $\theta_n$ and elevation from $\phi_n$ for each camera 18, and the distance L are always known at any given time $t_s$ during the flight of the golf ball 22. Thus, at a given time t, the coordinates of a golf ball's position in x-y-z space can be determined using the video signal ($\theta_n$, $\phi_n$) from the first and second cameras $18_{(1)}$ and $18_{(2)}$ and physical measurements from the driving range 12 (e.g. L). Manipulations will proceed as follows:

With reference to FIG. 5A and the x-y plane:
$y/x_m = \tan \theta_1$; also
$y/(L-x_m) = \tan \theta_2$; therefore
$y = x_m \tan \theta_1 = (L-x_m) \tan \theta_2$; and
in the equation $x_m \tan \theta_1 = (L-x_m) \tan \theta_2$, only $x_m$ is unknown; thus
solve for $x_m$.

From the above:
$y = x_m \tan \theta_1$ where only y is unknown; thus
solve for y.

Figure 5B:
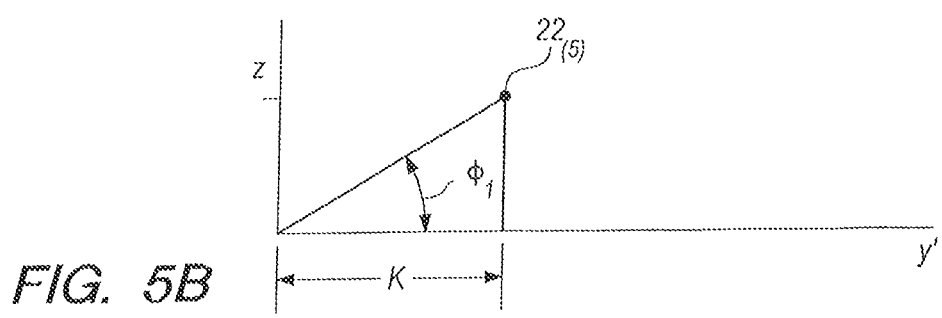
FIG. 5B is a geometrical representation of the elevation angle $\phi_1$ for the selected golf ball in a y'-z plane at the azimuth angle $\theta_1$ for use in calculating a value for the z coordinate of the golf ball at the time $t_s$.

Still in the x-y plane:

$x_m^2 + y^2 = k^2$ where k is the distance between the first camera $18_{(1)}$ and the projection of the golf ball 22 onto the x-y plane;

k then equals the square root of $x^2+y^2$; and with reference to FIG. 5B and a y'-z plane where k is located, $z/k = \tan \phi_n$, or $z = k \tan \phi_n$; thus solve for z.

As intended for the present invention, the same mathematical manipulation can then be made during the entire flight of the golf ball 22. Importantly, the golf ball 22 can be passed off from the cameras 18 covering sector 30 to the cameras 18 covering sector 32 and further, if needed to the cameras 18 covering the sector 34.

While the particular System and Method for 3D Optical Tracking of Multiple In-Flight Golf Balls as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for visually tracking the trajectory of a single golf ball selected from a plurality of in-flight golf balls, in real time, which comprises:

an n number of cameras ($1^{st}, 2^{nd}, 3^{rd} \ldots n^{th}$), wherein the cameras are surveyed into a position on the periphery of a driving range, with the first and second cameras positioned to define a base line having a length L therebetween, and to establish a horizontal center line midway between the first and second cameras perpendicular to the base line, wherein the base line and the center line establish an x-y plane in a three dimensional x-y-z space for the driving range wherein the video signal from each camera comprises a plurality of pixels arranged in a camera focal plane defined by a horizontal axis and an orthogonal vertical axis, and wherein the position of a pixel on the horizontal axis of the camera focal plane corresponds to the azimuth angle $\theta_n$ of the golf ball and its position on the vertical axis corresponds to the elevation angle $\phi_n$ of the golf ball;

a plurality of bays for respectively launching a golf ball therefrom, wherein the bays are aligned in a tee-line parallel to the base line, wherein each bay in the tee-line is mapped into a unique set of pixels on a camera imaging focal plane;

a central computer for receiving a respective video signal from each of the n number of cameras, wherein the video signal includes an azimuth angle $\theta_n$ and an elevation angle $\phi_n$ for the golf ball in the x-y-z space relative to the surveyed position of the $n^{th}$ camera in the x-y-z space, wherein the computer continuously updates an in-flight x-y-z coordinate position for the golf ball in the x-y-z space based on mathematical manipulations of data in the video signal from the n number of cameras; and a display monitor connected with the computer for visually tracking the flight path of the golf ball in the x-y-z space.

2. The system recited in claim 1 wherein a range R is established from a camera to a golf ball location in a selected bay, and the range R is determined at the time the golf ball is launched and is established by reference to a calibration of pixels in the x-y plane between the camera and the golf ball in the bay, to establish an accurate association of the camera with the bay for subsequent 3-D tracking of the in-flight trajectory of the golf ball.

3. The system as recited in claim 2 further comprising a High Speed Video Graphics Processor (HSVGP) for simultaneously receiving video signals from the n number of cameras to filter from the video signals stationary background clutter, objects having a predetermined speed below that of an in-flight golf ball, and other golf balls to reveal only the golf ball launched from the selected bay in the camera focal plane.

4. The system recited in claim 1 wherein cameras are aligned on both sides of the driving range opposite the horizontal center line to establish a plurality of opposed pairs of cameras, wherein the respective fields of view for cameras in a pair cover a same sector of the driving range, and they overlap with the fields of view of cameras covering an immediately adjacent sector of the driving range.

5. The system as recited in claim 4 wherein the computer creates a cue of golf balls from each in-flight trajectory in a sector, and sequentially transfers the golf balls in the cue, in their order, to cameras in the adjacent down-range sector to indicate where and when the golf ball should arrive in the down-range sector for further tracking through the x-y-z space.

6. The system as recited in claim 5 wherein the central computer correlates each golf ball trajectory with a particular bay on the tee line and with a predetermined target in the driving range.

7. The system as recited in claim 6 wherein the central computer detects whether two golf balls collide in flight, and estimates post-impact trajectories to provide continued multi-ball disambiguation.

8. A system for visually tracking the trajectory of a single golf ball selected from a plurality of in-flight golf balls, in real time, which comprises:

an m number of bays arranged contiguously along a tee-line, wherein golf balls can be individually launched in a random manner, from any bay at any time, into an x-y-z space for flight on a respective trajectory therein;

an n number of cameras for respectively creating an n number of video streams of the x-y-z space, wherein each video stream from each camera covers a predetermined sector of the x-y-z space from a unique perspective, and wherein each video stream is presented on a respective camera focal plane;

a central computer for receiving the plurality of video streams for identifying a start point in a predetermined bay on the camera focal plane of each video stream, for establishing when a golf ball is launched from the start point onto its trajectory through the x-y-z space, and for filtering stationary background clutter and the trajectories of other golf balls from the camera focal plane; and a visual display positioned in each bay and connected to the central computer for showing the trajectory in real time of the golf ball launched from the particular bay and through the x-y-z space from its start point in the bay to a target end point.

9. The system recited in claim 8 wherein the camera focal plane from each camera comprises a plurality of pixels arranged relative to a horizontal axis and an orthogonal vertical axis, and wherein the position of a pixel on the horizontal axis of the camera focal plane corresponds to the azimuth angle $\theta_n$ of the golf ball, and its position on the vertical axis corresponds to the elevation angle $\phi_n$ of the golf ball, and wherein each bay in the tee-line is mapped into a unique set of pixels on a camera imaging focal plane.

10. The system recited in claim 9 wherein a range R is established from a camera to a golf ball location in a selected bay, wherein the range R is determined at the time the golf ball is launched and is established by reference to a calibration of pixels in the x-y plane between the camera and the golf ball in the bay, to establish an accurate association of the camera with the bay for subsequent 3D tracking of the in-flight trajectory of the golf ball.

11. The system recited in claim 9 wherein the computer continuously updates an in-flight x-y-z coordinate position for the golf ball in the x-y-z space based on mathematical manipulations of data in the video streams from the n number of cameras.

12. The system recited in claim 8 wherein cameras are positioned to establish a plurality of opposed pairs of cameras, wherein the respective fields of view for cameras in a pair cover a same sector of the golf ball in-flight trajectory, and they overlap with the fields of view of cameras covering an immediately adjacent sector of the golf ball in-flight trajectory.

13. The system recited in claim 12 wherein the computer creates a cue of golf balls from each in-flight trajectory in a sector, and sequentially transfers the golf balls in the cue, in their order, to cameras in the adjacent down-range sector to indicate where and when the golf ball should arrive in the down-range sector for further tracking through the x-y-z space.

14. The system recited in claim 13 further comprising a High Speed Video Graphics Processor (HSVGP) for simultaneously receiving video signals from the n number of cameras to filter from the video signals stationary background clutter and objects having a predetermined speed below that of an in-flight golf ball, to reveal only golf balls as moving objects in the camera focal plane.

15. The system recited in claim 8 wherein the central computer correlates each golf ball trajectory with a particular bay on the tee-line and with a projected target in the driving range.

16. The system recited in claim 8 wherein the central computer detects whether two golf balls collide in flight, and estimates post-impact trajectories to provide continued multi-ball disambiguation.

17. A non-transitory, computer-readable medium having executable instructions stored thereon that direct a computer system to perform a process for tracking the trajectory of a single golf ball in a driving range, the trajectory being selected from a plurality of in-flight golf balls in real time, the medium comprising instructions for:

receiving a video stream from each of an n number of cameras;

arranging a plurality of pixels from each video stream into a camera focal plane defined by a horizontal axis representing an azimuth angle $\theta_n$ and a vertical axis representing an elevation angle $\phi_n$;

identifying a golf ball location in a selected camera focal plane at the time a golf ball is launched into the driving range;

filtering the video streams to remove stationary background clutter, objects having a predetermined speed below that of an in-flight golf ball, and other golf balls not identified in the identifying instruction, to reveal only the identified golf ball in the focal plane;

calculating an in-flight coordinate location for the identified golf ball after launch, based on azimuth and elevation measurements from the cameras;

continuously updating the in-flight coordinate location of the identified golf ball to create a trajectory for the identified golf ball; and presenting the in-flight trajectory of the identified golf ball for visual evaluation by a golfer.

18. The medium recited in claim 17 further comprising instructions for:

detecting when two golf balls collide in flight; and
estimating post-impact trajectories to provide continued multi-ball disambiguation.

* * * * *

UNITED STATES PATENT AND TRADEMARK OFFICE
CERTIFICATE OF CORRECTION

PATENT NO. : 10,751,569 B2
APPLICATION NO. : 15/634989
DATED : August 25, 2020
INVENTOR(S) : Joseph R. Guerci et al.

Page 1 of 1

It is certified that error appears in the above-identified patent and that said Letters Patent is hereby corrected as shown below:

In the Specification

Column 3, Line 23 - after the word "time" DELETE "is:" and INSERT -- $t_s$; --.

Column 4, Line 9 - after the word "shown," and before the word "number" DELETE "them" and INSERT -- the m --.

Signed and Sealed this
First Day of December, 2020

Andrei Iancu
*Director of the United States Patent and Trademark Office*